United States Patent [19]

Monick

[11] Patent Number: 4,491,203

[45] Date of Patent: Jan. 1, 1985

[54] POWER SCREW DISC BRAKE WITH INTERNAL AUTOMATIC SLACK ADJUSTER

[75] Inventor: Frederick R. Monick, Chicago, Ill.

[73] Assignee: Eaton Corporation, Cleveland, Ohio

[21] Appl. No.: 500,202

[22] Filed: Jun. 1, 1983

[51] Int. Cl.³ .......................................... F16D 55/224
[52] U.S. Cl. .................................. 188/71.9; 188/72.8; 188/196 BA; 188/196 D
[58] Field of Search ................. 188/72.8, 72.7, 71.9, 188/196 BA, 196 P, 196 D, 196 V; 192/94, 111 A

[56] References Cited

U.S. PATENT DOCUMENTS

| | | | |
|---|---|---|---|
| 3,976,168 | 8/1976 | Yamamoto | 188/71.9 |
| 4,014,411 | 3/1977 | Troester | 188/71.9 |
| 4,022,300 | 5/1977 | Afanador et al. | 188/71.9 X |
| 4,036,330 | 7/1977 | Henning et al. | 188/72.8 |
| 4,050,549 | 9/1977 | Hori et al. | 188/72.8 |
| 4,319,669 | 3/1982 | Wantanabe | 188/72.8 |
| 4,374,551 | 2/1983 | Birkenbach et al. | 188/71.9 |
| 4,399,894 | 8/1983 | Tribe | 188/71.9 |

Primary Examiner—Bruce H. Stoner, Jr.
Assistant Examiner—Michael P. Gilday
Attorney, Agent, or Firm—C. H. Grace; H. D. Gordon

[57] ABSTRACT

A power screw type disc brake having an internal automatic slack adjustor of the single acting, clearance sensing type is provided. The actuating/clearance sensing mechanism (10) of the disc brake includes a power screw (18) selectively rotatable by means of a lever (12) which power screw is threadably engaged with a power nut (42) axially moveable but rotationally fixed relative to a housing (22). The power nut is resiliently urged by a spring (70) into constant engagement with a push rod member (50) which carries a pressure member (16) threadably attached thereto. The push rod member is axially and rotationally moveable relative to the housing and the pressure member (16) is axially moveable but rotationally fixed relative to the housing whereby rotation of the push rod member will result in axial movement of the pressure member for slack or running clearance adjustment purposes. The push rod member is rotationally connected to the power screw member by means of a torque limited friction clutch (84, 86, 88) and a separate one-way ratchet connection (94, 98) permits rotation of the push rod member relative to the housing in the direction of rotation axially moving pressure member (16) in the slack decreasing direction but prohibits rotation of the push rod member in the other direction of rotation.

13 Claims, 2 Drawing Figures

POWER SCREW DISC BRAKE WITH INTERNAL AUTOMATIC SLACK ADJUSTER

BACKGROUND OF THE INVENTION

1. Field of the Invention

The present invention relates to power screw type disc brakes and more particularly to power screw type disc brakes having internal force or clearance sensing automatic, single acting (i.e. operates automatically in the slack take-up direction only) slack adjusters.

2. Brief Description of the Prior Art

Power screw type disc brakes of the type wherein rotation of an externally threaded shaft, known as the power screw, acts upon an internally threaded member, known as the power nut, to apply a clamping force to the friction material on one or both sides of a brake disc are well known in the prior art. Examples of such power screw disc brakes may be seen by reference to U.S. Pat. Nos. 3,976,168; 4,014,411; 4,022,300; 4,036,330 and 4,050,549, the disclosures of which are all hereby incorporated by reference.

Several of the prior art power screw disc brakes utilize external slack adjusters of the manual or automatic type. Such external slack adjusters were typically incorporated into the lever arms by which rotational movement was applied to the power screw and were often identical or substantially identical to automatic slack adjusters utilized for "S" cam expanding shoe drum brakes. Examples of such external slack adjusters are well known in the prior art and may be seen by reference to U.S. Pat. Nos. 3,507,369; 3,901,357; 4,256,208 and 4,351,419 the disclosures of all of which are hereby incorporated by reference.

Other designs of the prior art power screw type disc brakes utilize internal automatic slack adjusters of both the force sensing and the stroke sensing type. Examples of such prior art power screw disc brakes may be seen by reference to the above-mentioned U.S. Pat. Nos. 3,976,168 and 4,014,411.

The prior art power screw d.sc brakes utilizing stroke sensing automatic slack adjusters, both of the internal and external type, were not totally satisfactory as stroke sensing automatic slack adjusters tend to overadjust the brakes. The prior art power screw disc brakes utilizing external slack adjusters, of both the stroke sensing and clearance sensing type, were not totally satisfactory as the slack adjuster was not enclosed and protected within the disc brake mechanism and as the disc brake mechanism could not be specifically designed for a specific type of automatic slack adjuster.

The prior art power screw disc brakes utilizing internal automatic slack adjusters of the clearance sensing type minimize many of the drawbacks of the above mentioned types of power screw disc brakes but were not totally satisfactory as the structure of the automatic slack adjustment mechanism tended to be rather complicated, expensive to produce, require an undesirably large amount of space, difficult to maintain, difficult to manually backoff and/or less reliable than desired.

SUMMARY OF THE INVENTION

In accordance with the present invention, the drawbacks of the prior art have been overcome or minimized to the extent that a power screw type disc brake having an internal, automatic, single acting, clearance sensing slack adjuster of relatively simple, compact and reliable design is provided. The above is accomplished by utilizing a selectively rotatable power screw which cooperates with a power nut to engage and disengage the disc brake, and a torque limiting friction clutch of the disk type to drive an adjustment member to automatically adjust for sensed excessive clearance in the brake mechanism. A spring biased one-way ratchet comprising two face ratchet surfaces, one of which is nonrotationally fixed to the actuator housing, is configured to be lockingly engaged in the direction of rotation rotating the adjustment member in the slack increasing direction and configured to override to allow rotation of the adjustment member in the slack decreasing, or slack take-up direction of rotation.

A portion of the power screw and/or the power nut is cup shaped to define an internal cavity within which is received the torque limiting friction clutch and the ratchet spring to provide a compact mechanism.

Accordingly, a power screw disc brake with an internal, single acting, automatic clearance sensing slack adjuster is provided which is compact and utilizes relatively well known, inexpensive and reliable components such as a reliable friction clutch as the force or clearance sensing mechanism and a reliable ratchet connection to provide the anti-backoff function.

Accordingly, it is an object of the present invention to provide a new and improved disc brake of the power screw type utilizing an internal, single acting automatic slack adjuster of the clearance or force sensing type.

This and other objects and advantages of the present invention will become apparent from a reading of the detailed description of the invention taken in connection with the drawings.

DESCRIPTION OF THE PREFERRED EMBODIMENT

Figure 1:
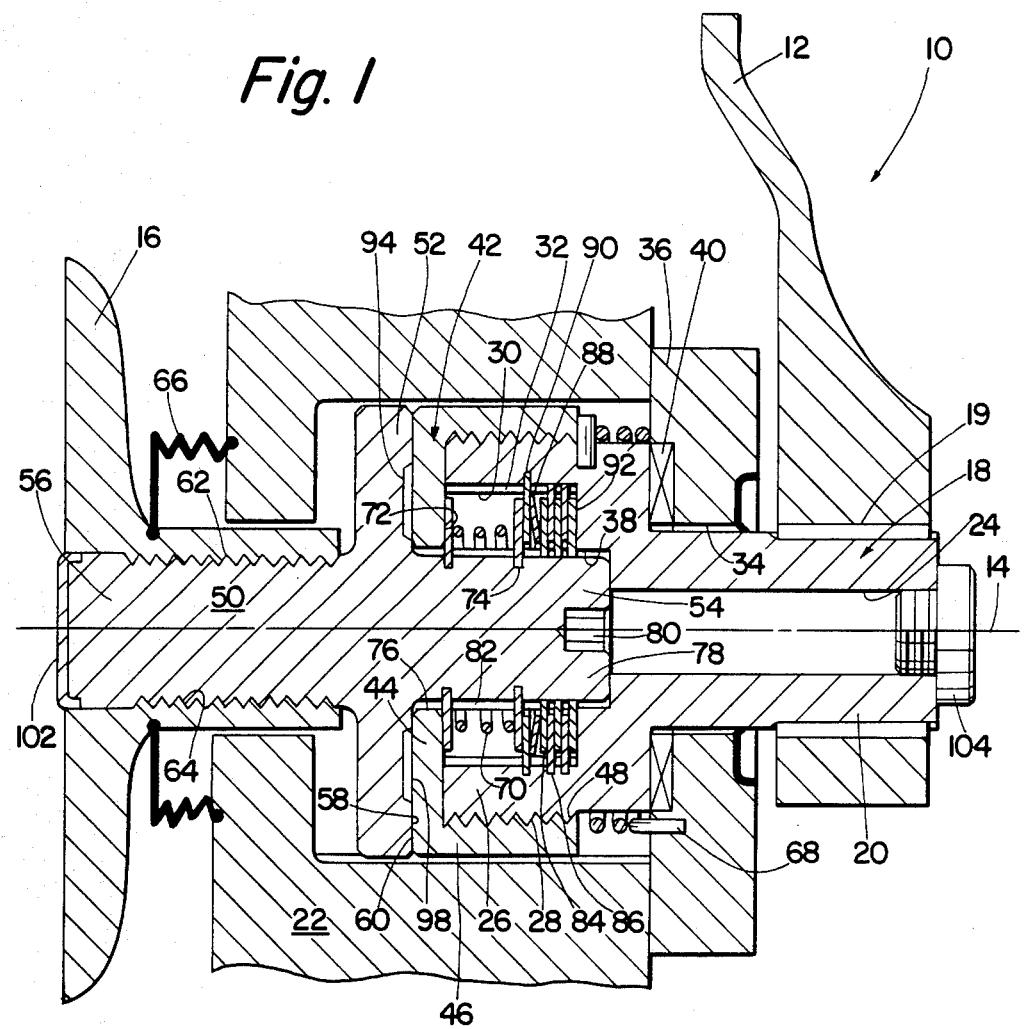
FIG. 1 is a partial sectional view of the power screw disc brake actuating and automatic slack adjustment mechanism of the present invention.

Certain terminology will be used in the following description for convenience in reference only and will not be limiting. The words "upwardly," "downwardly," "rightwardly" and "leftwardly," will designate directions in the drawings to which reference is made. The words "clockwise" and "counterclockwise" will designate directions of rotation as viewed from the right of the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

Figure 2:
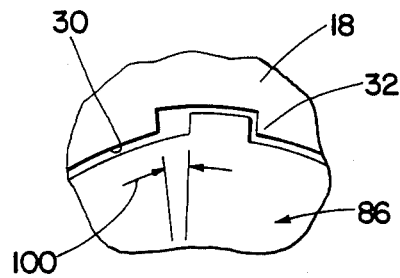
FIG. 2 is a partial view of a portion of the mechanism of FIG. 1.

The power screw disk brake actuation and automatic clearance sensing slack adjustment mechanism 10 of the present invention may be seen by reference to FIGS. 1 and 2. Briefly, pivotal movement of lever member 12 about its rotational axis 14 is effective to axially advance and retract a pressure member 16 of a known caliper assembly (not shown) to apply and release, respectively, friction materials to a disc brake disc (not shown). Caliper and disc constructions utilized in power screw and other type disc brake assemblies are well-known in the prior art and the specific structures thereof form no part of the present invention. Although the present invention is particularly well suited for utilization in an air actuated power screw disc brake, it is understood the present invention is equally applicable to hydraulically and or electrically actuated power screw disc brakes.

Typically, the upper end of lever 12, which is preferably a one-piece stamping or casting, is drivingly attached to an air motor of known type to cause selective pivotal movement of lever 12. As is known, an air motor has a limited effective stroke and accordingly it is desirable that the running clearance, or slack, between the caliper assembly friction pads and the disc be maintained at no less than a predetermined minimum to prevent dragging of the disc and at no greater than a predetermined maximum to prevent exceeding the effective length of the air motor stroke required to apply the disc brake. The requirement for maintaining the disc brake slack within predetermined limits, and the use of automatic and/or manual slack adjusters to achieve same, is well-known in the prior art.

Lever 12 is nonrotatably attached as at spline connection 19 to a rotatable externally threaded member, or power screw, 18. Power screw 18 includes an elongated shaft portion 20 extending rightwardly from actuator and caliper housing 22 and provided with an internal bore 24. At its leftward end, power screw 18 is provided with an enlarged outer diameter portion 26 which carries external power threads 28. Enlarged diameter portion 26 of power screw 18 is also provided with an enlarged inner diameter bore 30 having internal splines 32 formed therein and an intermediate inner diameter bore portion 34 interposed bore portions 24 and 30. A pressure plate or housing member 36 is fixed to housing 22 and defines an inner bore 38 for rotatably supporting the power screw 18 in housing 22 and for carrying a thrust washer or bearing 40 for transmitting axial thrust on power screw 18 to the housing.

An internally threaded power nut member 42 is axially movably but nonrotatably received within housing 22 as by a spline connection or the like (not shown). Power nut 42 is of a generally cup shaped structure comprising a base portion 44 and a hollow axially extending wall portion 46 provided with internal power threads 48 threadably engaged with the external power threads 28 carried by the power screw 18. Accordingly, rotation of power screw 18 relative to housing 22 will result in axial movement of power nut 42 relative to housing 22.

A piston or push rod member 50 comprising an enlarged diameter centrally located flange portion 52, a rightwardly or inwardly extending shaft portion 54 and a leftwardly or outwardly extending shaft portion 56 is retained within housing 22 for axial and rotational movement relative thereto. The rightward face 58 of flange portion 52 of push rod 50 abuts the leftward face 60 of power nut 42 for axial movement therewith to apply and release the disc brake by means of the pressure plate 16 which is threadably carried by shaft portion 56 of push rod 50 by means of external threads 62 provided on shaft portion 56 and internal threads 64 provided on the pressure member 16. Pressure member 16 is nonrotatably fixed to housing 22 and thus rotation of push rod 50 will axially advance or retract pressure member 16 relative to push rod 50 and power nut 42 to adjust the running clearance or slack in the disc brake. A seal member 66 is provided between the pressure member 16 and housing 22 to seal the interior mechanisms of housing 22.

Opposite ends of a torsional return spring 68 are received within thrust plate 36 and power screw 18 to rotationally urge power screw 18 to its at rest or brake disengaged position. A return spring in the air chamber mechanism (not shown) may also be utilized to supplement the return function of lever 12 and power screw 18. A compression spring 70 extends between the rightward face 72 of flange portion 44 of power nut 42 and a spring seat washer axially fixed to the shaft portion 54 of push rod 50 to resiliently maintain surfaces 58 and 60 of push rod 52 and power nut 42, respectively, in resilient abutting retention.

In operation, to apply the disc brake by forcing pressure member 16 axially leftwardly and to then release the brake by movement of pressure member 16 axially rightwardly, lever 12 is pivoted about axis 14 causing a rotation of power screw 18 which results in a leftward axial movement of power nut 42, push rod 52 and pressure member 16. To release the brake, lever member 12 is pivoted to its at rest position by retraction of the unshown air motor and by return torsion spring 68 resulting in a rightward axial movement of power nut 42, and push rod 52 and pressure member 16 which are spring biased by compression spring 70 to move axially with power nut 42.

To maintain the running clearance of the disc brake within predetermined limits, mechanism 10 is also provided with an automatic single acting, clearance sensing, automatic slack adjustment mechanism. As mentioned above, push rod 50 is rotatably and axially moveable within housing 22 and carries pressure member 16 threadably attached thereto at internal adjustment threads 64 and external adjustment threads 62. Pressure member 16 is axially moveable but rotationally fixed relative to housing 22. Accordingly, rotation of push rod member 50 relative to housing 22 and pressure member 16 will result in an axial movement of pressure member 16 relative to the push rod for purposes of adjusting the slack or running clearance of the brake. The base portion 44 of power nut 42 is provided with an internal bore 76 for receipt of inwardly extending shaft portion 54 of the push rod member 50. The inner end 78 of shaft portion 54 is piloted in bore portion 34 of power screw 18 and is rotatable relative thereto. The inner end 78 of shaft portion 54 is provided with a fitting 80, such as a hex fitting or the like, for manual adjustment purposes as will be described in greater detail below. Shaft portion 54 is provided with external splines 82 along at least a portion of its outer pheriphery on which are slideably but substantially non rotationally received clutch plates or discs 84. A plurality of clutch discs 86 are splined to power nut 18 at internal splines 32 thereof for slideably but substantially non rotational movement relative thereto. Clutch discs 84 and 86 are interdigitated to form a clutch disc pack and are biased into frictional engagement by means of a clutch spring 88, preferably a Belleville washer, retained by a retaining washer 90, to compress the clutch discs between retaining spring 88 and the shoulder 92 defined by the intersection of bore portions 30 and 34. Accordingly, rotation of power screw 18 will result in an equal rotation of push rod member 50 in the absence of the slipping of the clutch disc pack defined by clutch discs 84 and 86. Rotation of push rod 50 will result in pressure member 16 moving axially outwardly or inwardly relative to push rod 50 for slack take-up or increasing purposes. The friction disc clutch 84–86 is designed to have a maximum torque transfer capacity sufficient to overcome the frictional resistance to rotation of push rod member 50 when the brake friction materials are not in contact with the brake disc but insufficient to overcome the resistance to rotation of push rod 50 when the brake friction pads are in contact with the brake disc. Accordingly, the friction clutch 84-86 provides a force or clearance sensing automatic slack adjustment as is well-known in the prior art.

Abutting faces 58 and 60 of push rod 50 and power nut member 42, respectively, are provided with annular arrays of ratchet teeth 94 and 98, respectively, to define a one-way face ratchet mechanism resiliently biased into contact by return spring 70. Ratchet teeth 94 fixed to power screw member 42 are rotationally fixed relative to housing 22 and co-act with ratchet 98 fixed to push rod 50 to override or ratchet in the direction of rotation of push rod 50 resulting in an axially outward movement of pressure member 16 relative to push rod 50, or the slack take-up direction of rotation of push rod 50. Ratchet teeth 94 and 98 are designed to engage in a positive manner preventing relative rotation therebetween in the other direction of rotation and thus, when engaged, prevent rotation of push rod member 50 in a direction of rotation tending to move pressure member 16 axially inwardly or rightwardly or in the slack increasing direction of rotation. Ratchet teeth 94 and 98 thus defined a positive anti-backoff mechanism for adjustment and actuation mechanism 10.

As may be seen by reference to FIG. 2, the spline connection between power nut member 18 and driven clutch discs 86 is provided with a degree of back-lash or lost motion 100 allowing a predetermined rotation of power screw 18 and predetermined axial movement of power nut 42, and pressure member 16 which moves axially therewith, prior to rotation of push rod 50. This predetermined lost motion 100 is sufficient to maintain a predetermined running clearance between the brake friction members and brake disc. Of course, as is known in the prior art, the lost motion required to maintain the desired running clearance may be provided at the splined connection 19 between lever 12 and power screw 18, at the splined connection between the power screw 18 and the driving clutch disc 86, at the splined connection between the push rod 50 and the driven clutch discs 84 and/or at the threaded connection between push rod 50 and pressure member 16.

In operation, pivotal movement of lever 12 will result in a rotational movement of power screw 18 and axial advancement of power nut 42 push rod 50 and pressure member 16 as has been discussed above to apply the brakes. If application of the brakes requires a rotational movement of power sc:ew 18 equal to or less than that required to take up lost motion 100, which is an indication that the running clearance of the brakes is within predescribed limits, no automatic adjustment of the brake occurs. If application of the brakes requires rotational movement of power screw 18 beyond that required to take up the lost motion 100, the friction discs 84 and 86 will transmit a rotational motion to push rod 50 from power screw 18. Such rotational movement of push rod 50 relative to housing 22, and pressure member 16 rotationally fixed thereto, will result in an axially outward advancement of pressure member 16 relative to push rod 50 to decrease the slack in the brake. Rotational movement of push rod 50 relative to housing 22 and power nut member 42 rotationally fixed thereto will result in a ratcheting action of the resiliently engaged ratchet face surfaces 94 and 98. Upon engagement of the brake friction surfaces with the brake disc, the torque required to continue to rotate push rod 50 relative to housing 22 and pressure member 16 will exceed the torque transfer capacity of the friction discs 84 and 86 and the friction discs will slip. Accordingly, rotation of the power screw member 18 beyond that required to bring the friction pads into contact with the brake discs, i.e. that portion of rotation of the power screw resulting in deformation of the brake components rather than in clearance take-up of the brake components, will not result in a slack adjustment rotation of push rod 50 and thus mechanism 10 is a force or clearance sensing type of automatic slack adjustor. On the return rotation of power screw member 18, power nut 42 and push rod 52 and pressure members 16 which are biased by spring 70 to move axially therewith will move to the retracted position. Rotation of push rod member 50 as a result of torque supplied by friction discs 84 and 86 will be prevented by the one-way ratchet defined by ratchet teeth 94 and 98 also biased into connected by spring 70. Accordingly, retraction of the brake will not result in a backing off of the force member 16.

The internally threaded bore of pressure member 16 is provided with a seal member 102 and the outer end of bore 24 of power screw 18 is provided with a removeable seal plug 104 which is removeable for access from the exterior of the brake to fitting 80 via bore 24.

A seal 108 is provided between the exterior surface of power screw 18 and housing plate member 36. For manual adjustment of the brake, such as for manual back-off of the brake for installing new friction pads or the like, seal 104 is removed and a tool having an end complementary with the fitting 80 at the inner end of push rod 50 is inserted through the bore and into contact with the fitting 80. The push rod 50 is then urged outwardly or leftwardly against the bias of spring 7 to disengage the one-way ratchet 94-98 allowing the push rod 50 to be rotated in the slack decreasing direction of rotation. The tool utilized will preferably be in the form of a lever as rotation of the push rod 50 by means of fitting 80 will require overcoming the frictional resistance to rotation provided by clutch discs 84 and 86.

Accordingly, it may be seen that a power screw type of disc brake is provided having an internal automatic, single acting clearance sensing type of slack adjustor utilizing simple and reliable components. The clearance sensing function of the automatic slack adjustor is provided by the friction disc pack comprising friction discs 84 and 86 biased into contact by Belleville washer 88 and the one-way or anti-backoff function of the automatic slack adjustor is provided by the one-way face ratchet comprising ratchet teeth 94 and 98 biased into contact by return spring 70.

While the present invention has been described in its preferred form with a certain degree of particularity, it is understood that various modifications and rearrangement of the components is possible within the spirit and the scope of the invention as hereinafter claimed.

I claim:

1. A power screw type disc brake with an internal automatic single acting clearance sensing slack adjustor, said disc brake comprising;
a housing mountable to a support structure, said housing defining an internal cavity therein;
a power screw member mounted in said housing, said power screw member axially fixed but rotationally movable relative to said housing, said power screw member carrying a power screw thread thereon;

means to selectively rotate said power screw member about its rotational axis;

a power nut member axially moveable and rotatably fixed in said housing, said power nut member carrying a power nut thread threadably engaged with said power screw thread whereby rotation of said power screw relative to said housing in a first direction of rotation will move said power nut member in a first axial direction relative housing and rotation of said power screw member in the second direction of rotation will move said power nut member axially in a second direction relative to said housing;

a push rod member axially and rotatably moveably received in said housing, said push rod member defining a first surface thereon facing in said second axial direction for abutment with a second surface defined by said power nut member facing in said first axial direction;

means resiliently biasing said first surface into abutting contact with said second surface whereby said push rod member will move axially with said power nut member in said first axial direction and is resiliently biased to move axially with said power nut member in said second axial direction;

a pressure member received into and extending from said housing, said pressure member axially moveable but rotationally fixed relative to said housing, said pressure member defining first adjustment threads threadably engaged with second adjustment threads defined on said push rod whereby said pressure member is axially moveable with said push rod upon axial movement of said push rod relative to said housing and said pressure member is axially moveable relative to said push rod upon rotational movement of said push rod relative to said housing;

a one-way ratchet connection between said push rod and said power nut defined by ratchet teeth formed in said first and second surfaces, said ratchet connection configured to allow relative rotation of said push rod relative to said housing in the direction of rotation causing said force member to move axially outwardly relative to said push rod and configured to prevent rotation of said push rod relative to said nut in the opposite direction of rotation;

a torque limited friction clutch separate from said ratchet connection for defining a two-way driving connection between said power screw and said push rod, the maximum torque transfer capacity of said friction clutch being greater than the torque required to rotate said push rod when said force member has not caused engagement of said brake but less than the torque required to rotate said push rod when said force member has caused engagement of said brake; and means providing a predetermined degree of lost motion between said means for rotating said power screw and said threaded connection between said force member and said push rod, said predetermined degree of lost motion corresponding to rotation of said power screw sufficient to axially move said force member an axial distance corresponding to a predetermined acceptable degree of running clearance between the brake friction members.

2. The disc brake of claim 1 wherein movement of said force member in first axial direction relative to said housing is effective to apply said brakes and movement of said force member relative to said push rod in said first axial direction is effective to decrease the running clearance in said brake.

3. The disc brake of claim 2 wherein said friction clutch includes at least one first friction member generally rotatable with said power screw, at least one second friction member generally rotatable with said push rod and means for resiliently biasing said first and second friction members into frictional contact.

4. The disc brake of claim 3 wherein said lost motion is provided at one of the rotatable connection between said first friction member and said power screw and the rotatable connection said second friction member and said push rod.

5. The disc brake of claim 3 additionally comprising a torsion spring having one end thereof fixed to said housing and the other end thereof fixed to said power screw, said torsion spring resiliently urging said power screw to the non-rotationally displaced position thereof.

6. The disc brake of claim 5 wherein said push rod includes an inner end thereof piloted within an internal bore provided in said power screw, said internal end of said push rod provided with a fitting, said external end of said bore in said power screw provided with a removable seal whereby said fitting is accessible from the exterior of said power screw, an axial force directed on the internal end of said push rod effective to move said push rod axially in said first axial direction relative to said power nut means sufficiently to disengage said ratchet connection whereby said push rod may be rotated in either direction of rotation.

7. The disc brake of claim 6 wherein said power screw means comprises a shaft portion extending outwardly from said housing in said second axial direction, said bore is provided through said shaft portion and said means for rotating said power screw means is nonrotatably mounted to said power screw at the exterior surface of said shaft portion.

8. A power screw type disc brake actuator and internal automatic slack adjustor assembly for selectively engaging and disengaging the friction members of a disc brake with a disc and for automatically maintaining a predetermined running clearance between the friction surfaces and the disc, said actuator and automatic slack adjustor assembly comprising:

a housing mountable to a support member, said housing having a first opening therethrough adjacent said friction surfaces and a second opening at the end thereof most distant said friction surfaces;

a power screw rotatably received in said housing and axially fixed therein, said power screw having a portion thereof extending axially outwardly through said second opening, said power screw defining a first power thread carried thereby;

first sealing means sealing said second opening and said exterior surface of said portion of said power screw extending through said second opening;

a lever member non-rotatably attachable to said portion of said power screw member extending from said second opening, said lever member attachable to a selectively actuatable power member for imparting a selective rotation to said power screw;

a power nut member received within said housing, said power nut member axially moveable and rotationally fixed in said housing; said power nut member defining a second power screw thread constantly threadably engaged with said first power screw thread whereby rotation of said power screw relative to said housing will be result in axial movement of said power nut member relative to said housing;

a push rod member having a first portion received within said housing, said push rod member rotatably and axially moveable relative to said housing, said push rod member axially moveable with said power nut member in the axial direction toward said first opening, a second portion of said push rod member defining first adjustor screw threads thereon;

means resiliently biasing a surface on said push rod member facing said second opening into abutting contact with a surface on said power nut member facing said first opening whereby said push rod member will axially move with said power nut member in the axially direction toward said first opening and is resiliently biased to move with said power nut member in the axial direction toward said second opening;

a pressure member defining second adjustor screw threads thereon constantly threadably engaged with said first adjustor screw threads, said pressure member axially movable and rotatably fixed relative to said housing, at least one of said pressure member and said second portion of said push rod member extending through said first opening of said housing, said pressure member axially moveable with said push rod member relative to housing and said pressure member axially moveable relative to said push rod member in response to rotation of said push rod member relative to said housing;

a one-way ratchet connection defined between said power nut and said push rod, said one-way ratchet connection defined by ratchet teeth formed on said first surface of said push rod member and said second surface of said power nut member, said ratchet configured to permit rotation of said push rod member relative to said power nut member in the direction of rotation causing said pressure member to move axially in said direction toward its first opening relative to said push rod member, said ratchet connection configured to prohibit rotation of said push rod relative to said nut member in the direction of rotation causing axial movement of said pressure member relative to said push rod member in the direction toward said second opening;

a torque limited friction clutch separate from said ratchet connection for defining a two-way connection between said power screw and said push rod, said friction clutch comprising at least one friction member generally rotatable with said power screw member and a second friction member generally rotatably with said push rod member and means resiliently biasing said first and second friction members into frictional contacts, the maximum torque transfer capacity of said friction clutch greater than the torque required to rotate said push rod when said disc brake is disengaged but less than the torque required to rotate said push rod when said disc brake is engaged; and means providing a degree of lost motion between said means for rotating said power screw and said threaded connection between said second portion of said push rod member and said pressure member, said lost motion allowing rotation of said power screw member sufficient to axially move said pressure member in the axial direction toward said first opening by an axial distance generally equal to the desired running clearance of said disc brake prior to causing rotation of said push rod member relative to said housing; and second sealing means for sealing said first opening in the at least one of said second portion of said push rod member and said pressure member extending thereto.

9. The disc brake of claim 8 wherein said power screw member is provided with a through bore opening to the exterior surface of said portion extending through said second opening, a removeable seal member is received within the exterior opening of said through bore in said power screw, the end of said push rod member closest said second opening is provided with a fitting therein coaxial with said throughbore, said fitting accessible through said through bore by a tool for axially moving said push rod member sufficiently to disengage said first and second surfaces and for rotating said push rod member for manual adjustment of said disc brake.

10. The disc brake of claim 9 wherein said lost motion is provided in one of said rotational connections of said first friction members with said power screw and said second friction member with said push rod.

11. The disc brake of claim 10 additionally comprising a torsion spring having one end thereof non-rotatably fixed to said power screw and the other end thereof non-rotatably fixed to said housing, said torsion spring effective to resiliently urge said power screw to the rotational position thereof causing the power nut to be moved to the axial position thereof closest said second opening.

12. The disc brake of claim 11 wherein said means resiliently biasing said surfaces into abutting contact comprises a compression spring received between said power nut member and a spring stop fixed to said push rod member at a portion thereof closer to said second opening than said first and second surfaces.

13. The disc brake of claim 12 wherein said power nut member is a generally cup shaped member defined by a radially extending face portion having a central bore therethrough and a generally axially extending wall portion extending from said base portion toward said second opening, a portion of said push rod member extending through said centrally located opening in said face portion, said power screw member includes an enlarged outer diameter portion telescopically received within said side wall portion of said power nut member, said first power screw threads are defined on the outer periphery of said enlarged diameter portion and said second power screw threads are defined on the inner diameter of said side wall portion, said enlarged diameter portion having a cavity therein opening towards said first opening in which said resilient means and said torque limited friction clutch are received, and said power screw member includes a intermediate inner diameter bore portion interposed said through bore and said cavity in which said end of said push rod member closest said second opening is rotatably supported.

* * * * *